June 22, 1965   F. H. BATTLE, JR., ETAL   3,191,175
AIRCRAFT LANDING SYSTEM
Filed May 6, 1960   7 Sheets-Sheet 1

INVENTORS
FREDERICK H. BATTLE, JR.
ABRAHAM TATZ
BY
ATTORNEYS

INVENTORS
FREDERICK H. BATTLE, JR.
ABRAHAM TATZ
ATTORNEYS

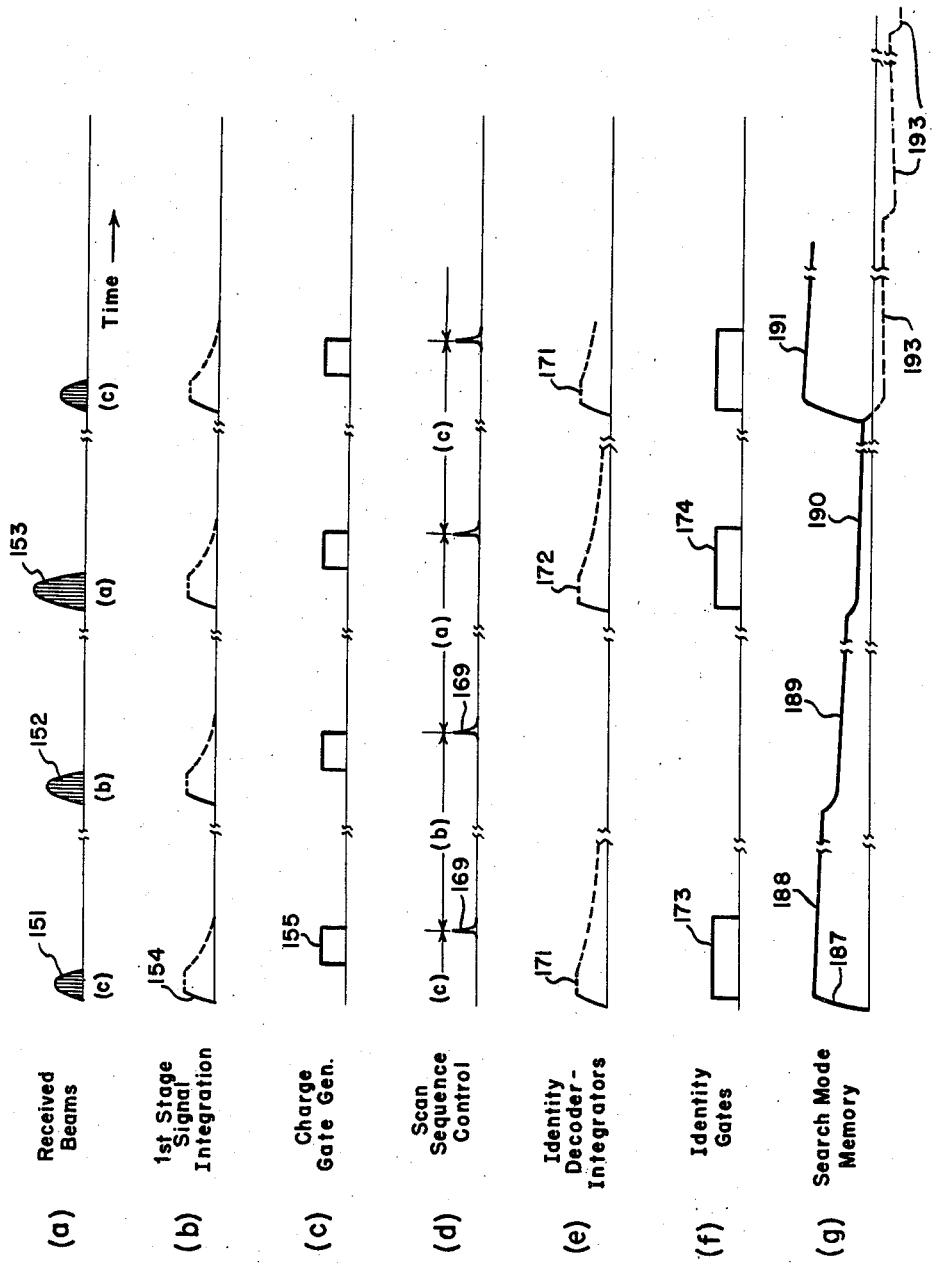

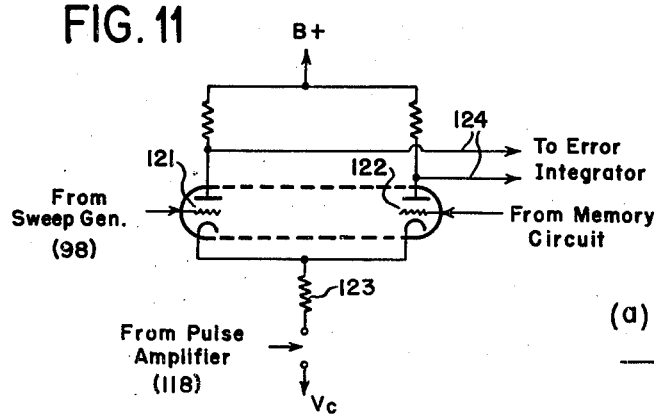
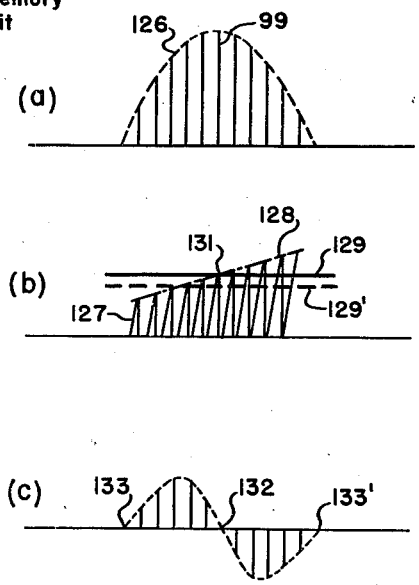
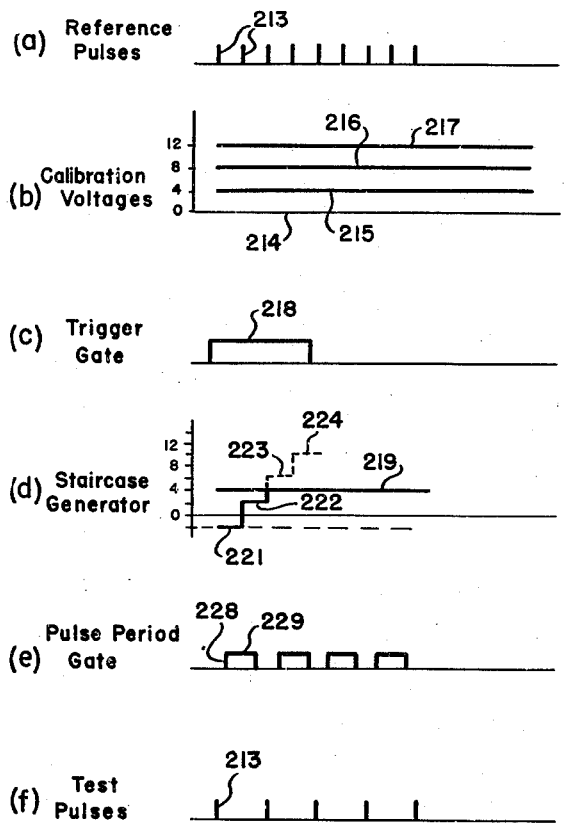

United States Patent Office 3,191,175
Patented June 22, 1965

3,191,175
AIRCRAFT LANDING SYSTEM
Frederick H. Battle, Jr., Seaford, and Abraham Tatz, Levittown, N.Y., assignors to Cutler-Hammer, Inc., Milwaukee, Wis., a corporation of Delaware
Filed May 6, 1960, Ser. No. 27,406
28 Claims. (Cl. 343—106)

This invention relates to radio aids to the navigation of aircraft, and particularly to improvements in landing systems capable of guiding aircraft to touchdown.

In our copending U.S. application Serial No. 825,469, filed July 7, 1959, and now abandoned, for "Aircraft Landing System," the subject matter of which is included in a continuation-in-part application Serial No. 123,928, now Patent No. 3,157,877, filed June 28, 1961, a system is described involving the use of two vertically scanning beams at respective sites spaced along the runway. The beams are coded in terms of their respective elevation angles, and further coded for identification, so that an aircraft with suitable decoding equipment can determine its angle from each of the two sites. With this information a desired landing path can be computed. Azimuth guidance is provided by a conventional localizer beam, or by a scanning beam employing the same techniques used for elevation.

The accuracy with which an aircraft can continuously determine its position in space with this technique depends not only on the precision with which the beam angle is coded and decoded, but also on how frequently the aircraft is supplied with angular information. The latter involves both the frequency with which the scanning beams are coded and the scanning repetition rate.

The coding system specifically described in the above-identified application is capable of considerable precision. However, with frequent transmission of angular information and a high scanning rate, the average pulse repetition frequency (PRF) of the transmissions becomes rather high for presently available transmitter tubes at high power levels, without resorting to unduly elaborate and expensive transmitting equipment.

In accordance with the present invention, a different coding method is provided in which a lower average pulse repetition frequency suffices for a given beam scanning rate. In part, this feature of the invention is based on the realization that it is unnecessary to know the aircraft position at high elevation angles (or wide azimuth angles) as accurately as at small angles approaching zero. At high angles an aircraft will be at some distance from the runway, either in its approach or in the initial glide portion of its landing maneuver. Although reasonable accuracy in determining its position at this time is desirable, the accuracy need not be as great as during the final flare-out to touchdown. Similarly, an aircraft will commonly line up with the center line of the runway at a considerable distance therefrom, so that less accuracy at an angle to the runway is allowable.

A further factor is that, even at small angles, the angle of the aircraft with respect to the front elevation site need not be known as accurately as that with respect to the rear elevation site, since only information from the latter is required during the final flare-out to touchdown. As to the azimuth beam, small angle accuracy need not be as great as that from the rear elevation site, inasmuch as the width of the runway allows some latitude.

In accordance with the present invention, a pulse coding is employed in which the time difference between successive pulse modulations represents the absolute angle from a reference angle (say 0°), the intervals between pulse modulations increasing as the angle increases. While the precision in decoding the intervals between pulse modulations may be the same at all angles, pulse modulations are transmitted less frequently at larger angles atnd hence the aircraft cannot determine its exact position as frequently. The resultant increase in granularity of the data at larger angles is not serious for the reasons given above, and the lower average duty cycle greatly facilitates high peak power pulse transmission without unduly expensive and elaborate equipment.

It is necessary to code the beams for identification purposes, as by using pulse pair modulations in lieu of single pulses. In accordance with a further feature of the invention pulse pairs are employed for identification on the front elevation beam and the azimuth beam only, and the angle coding intervals for these beams are selected so that the average PRF is approximately the same as that of the rear elevation beam. This permits substantially the same peak powers to be transmitted from all three sites with similar transmitting equipment, without sacrificing frequent transmissions of angle data from the rear elevation site.

Although different coding and decoding circuitry, based on either digital or analog techniques, may be employed, specific arrangements are described hereinafter which are believed to have many advantageous features. The coding equipment will usually be on the ground (or on a ship, etc.) where weight, space and cost are commonly of less importance than in the airborne equipment. It is preferred to employ digital techniques for the ground coding to secure maximum reliability and accuracy. However, analog coding systems are possible and may be employed if desired.

In the airborne equipment, it is preferred to employ analog decoding for reasons of space, weight, cost, etc. A specific embodiment of such a decoder is described hereinafter and has certain features incorporated therein which promote reliability and accuracy. Among these are special provisions to prevent interference such as noise, random pulse transmissions and reflected pulses from seriously affecting operation. Precision of decoding is promoted by using a calibration circuit which functions automatically in the intervals between beam passages over the aircraft.

While the system is capable of providing very accurate information of aircraft position, in many cases less accurate or less complete information may suffice, for example, for light planes landing under conditions of poor but not zero visibility. In such case considerably simpler aircraft equipment is possible than that specifically described hereinafter.

The invention will be described in connection with specific embodiments containing a number of advantageous features which in part will be pointed out and in part will be obvious to a person skilled in the art.

In the drawings:

FIGS. 9 and 10 are graphs illustrating the operation of various components in the receiver of FIG. 8;

FIG. 11 is a diagram of the tracking comparator of FIG. 8;

FIG. 12 shows graphs illustrating the operation of the tracking comparator; and

FIG. 13 shows graphs illustrating the operation of the calibration circuit of FIG. 8.

Figure 1:
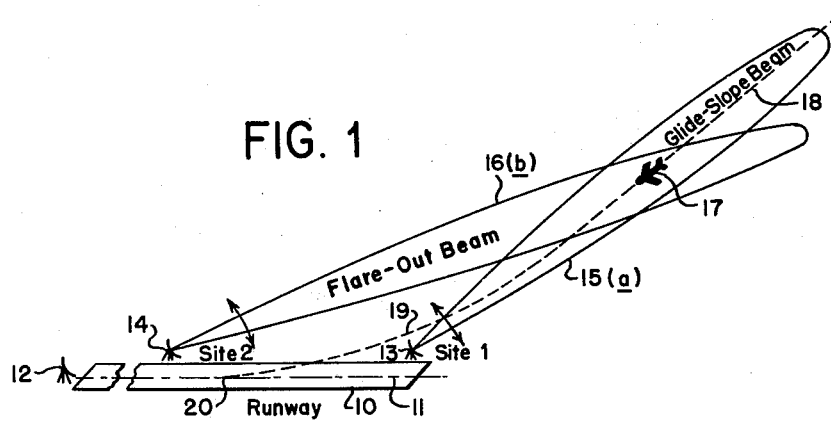
FIG. 1 is a view illustrating the use of two elevation beams to establish a landing path.

Referring to FIG. 1, this is the same as FIG. 1 of the above-identified application. A runway is indicated at 10 and the center line thereof at 11. A localizer 12 is provided for guiding an aircraft in azimuth so that its flight path is along the center line of the runway. Two vertically scanning antennas are shown at 13, 14 and designated "site 1" and "site 2". Site 1 is advantageously located near the front end of the runway and sufficiently to one side thereof so as not to be an obstacle. Site 2 is located down the runway a suitable distance, say 4,000 feet, and also to one side thereof. Sites 1 and 2 may be on the same side of the runway as shown, or on opposite sides.

The beams transmitted from sites 1 and 2 are designated 15 and 16, respectively (or $a$ and $b$ as mentioned hereinafter). These beams are narrow in the vertical plane, of the order of 0.5° between half-power points being contemplated in one specific embodiment. They are advantageously wide in the horizontal direction so as to be receivable by aircraft throughout the spatial volume normally occupied during landing maneuvers.

An airplane 17 is shown flying along a landing path comprising a glide portion 18 and a flare-out portion 19. It is here assumed that the glide portion is a straight line at a desired slope. This represents a type of path normally satisfactory for the initial portions of the landing maneuver and will be assumed hereinafter, although it would be possible to utilize information from the two beams to establish a different type of glide path.

During the flare-out 19, the rate of descent of the plane is gradually reduced until, at the touchdown point 20, it does not exceed a prescribed rate determined by the ruggedness of the plane and its use. For commercial passenger planes a rate of descent not exceeding about 2 ft./sec. is usually desirable, whereas for military planes it is sometimes considerably greater.

As shown by the double-headed arrows in FIG. 1, the beams from sites 1 and 2 repeatedly scan in the vertical direction. It is particularly contemplated that the beam will be transmitted during both up and down scans so as to increase the frequency with which an aircraft receives angle information, although the system could be arranged so that beams are transmitted in only one scanning direction, either up or down.

The manner in which the elevation angle information can be used to determine the vertical position of the aircraft at all times, and to establish a suitable landing path, is described in the above-identified application and need not be described here.

In the specific embodiment to be described hereinafter it is contemplated that the azimuth angle information will be transmitted to the plane in the same manner as vertical angle information.

Figure 2:
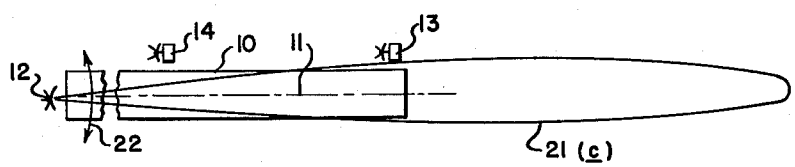
FIG. 2 is a plan view showing an azimuth scanning beam.

FIG. 2 shows localizer 12 as transmitting a beam 21 (or $c$) which scans in azimuth as indicated by the double-headed arrow 22. Advantageously the beam is narrow in the horizontal plane, say 0.5°, but wide in the vertical plane so as to provide azimuth information at all elevation angles covered by the vertical scanning beams.

The beams from sites 1 and 2, and the localizer beam will frequently be referred to hereinafter as beams $a$, $b$ and $c$, respectively. These letters are shown in parentheses in FIGS. 1 and 2.

Throughout this specification numerical values will often be given, for convenience and clarity of explanation. It will be understood that these are for illustrative purposes only, and that the invention is not confined thereto.

Figure 3:
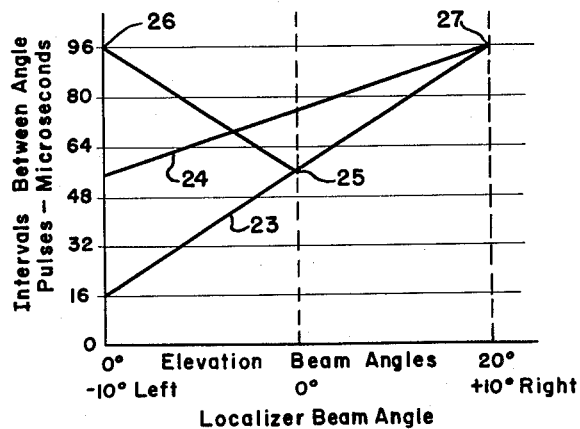
FIG. 3 is a graph illustrating a coding system in accordance with the invention.

Referring now to FIG. 3, a coding system in accordance with the invention is illustrated. FIG. 3 assumes that the elevation beams are scanning from 0° (horizontal) to 20°, and that the localizer beam is scanning from 10° left through zero (down the center line of the runway) to 10° right, and back again.

The coding of the elevation beam $b$ from site 2 is shown by line 23. This represents the interval between successive pulses as a function of the elevation angle. A minimum interval is selected to represent 0° such that it can readily be distinguished from the identification pulse intervals to be described. The minimum interval is shown as 16 microseconds. An upper limit may be selected in accordance with the desired frequency of transmission of angular information. As shown, the upper limit is 96 microseconds for 20°. Consequently a range of 80 microseconds is available for representing variations in angle.

The angle coding of the elevation beam from site 1 could be the same as that from site 2. However, one or the other (or both) of the beams are advantageously coded for identification purposes. It is here assumed that the beam $a$ from site 1 will be coded for identification but not beam $b$ from site 2, and that double pulses of predetermined separation will be employed in beam $a$ in place of single pulses in beam $b$. Beam $a$ is angle-coded as indicated by line 24. To equalize the overall PRF the minimum interval between successive angle pulses corresponding to 0° is greater than for beam $a$, being 56 microseconds as specifically shown. Accordingly fewer pulses per scan are used to transmit angle information for beam $a$ than for beam $b$, thus allowing the additional identification pulses to be inserted while maintaining an average PRF which does not greatly exceed that for beam $b$.

The localizer beam $c$ is angle-coded so that the most frequent transmission of azimuth information to an aircraft is when it is along the center line of the runway, or at a small angle thereto. Double pulses are employed for identification purposes, the separation between paired pulses being different for right and left scans. To obtain an overall PRF approximately the same as those of the elevation beams, a minimum interval 25 is selected which is the same as that of beam $a$, namely 56 microseconds. The interval increases linearly with angle and reaches 96 microseconds for 10° left and 10° right, as shown at 26 and 27.

The interval $T$ between successive angle pulses as a function of beam angle $\theta$ can be written in the form of equations. Thus the interval for beam $b$, with the numerical values shown in FIG. 3, can be written:

$$T = 16 + 4\theta \text{ microseconds} \quad (1)$$

Similarly, the interval for beam $a$ can be written:

$$T = 56 + 2\theta \text{ microseconds} \quad (2)$$

and the interval for localizer beam $c$ can be written:

$$T = 56 + 4\theta \text{ microseconds} \quad (3)$$

The minimum and maximum intervals can be selected as meets the requirements of a given application, and those for beam $c$ need not necessarily be the same as for beam $a$, nor the maximum for $a$ the same as for $b$. Also, although a linear variation with the angle is considered desirable, a suitable non-linear variation could be employed.

Figure 4:
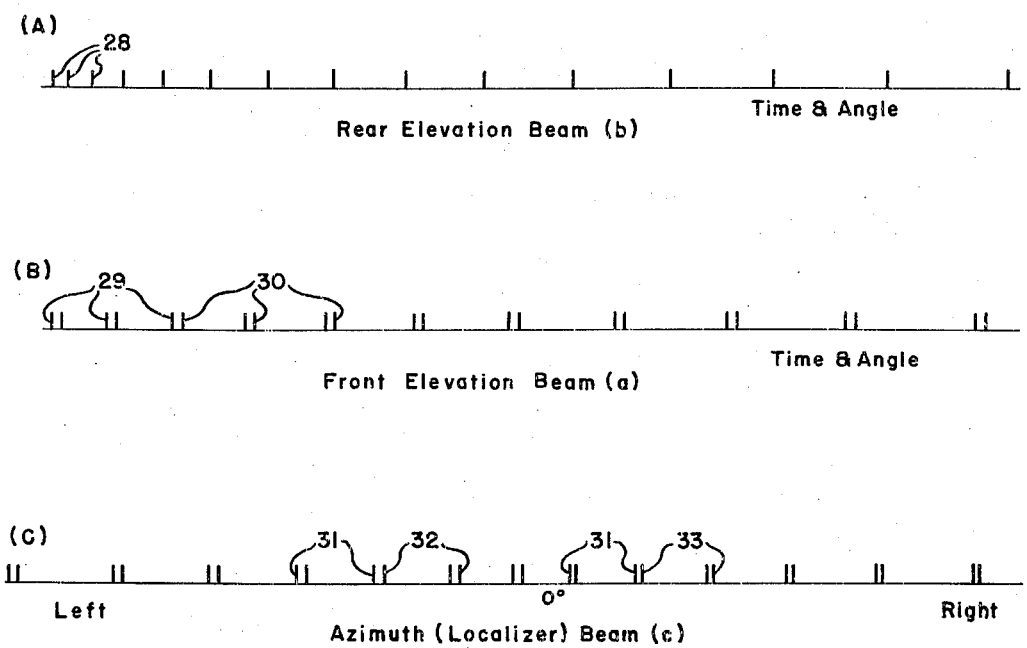
FIG. 4 shows graphs further illustrating the coding system of FIG. 3.

FIG. 4 is a different presentation of the beam coding. Here the horizontal lines represent both time and angle. It should be emphasized that FIG. 4 does not accurately represent the true situation, since many hundreds of pulses may be transmitted in a 20° angle, which is impractical to illustrate. However, it is believed that the figure will aid in understanding the coding system.

FIG. 4(A) illustrates the coding of beam $b$ from site 2. As will be observed, the spacing of pulses 28 increases as the beam angle increases.

FIG. 4(B) is a similar showing for beam $a$ from the front site 1. Here the pulse modulations comprise pulse pairs having first pulses 29 and second pulses 30. The It will be seen that the timing pulses repeatedly determine the pulse count in storage counter 48, and develop corresponding signals at time intervals proportional to the pulse counts on successive determinations.

The signals through line 62 to pulse modulator 63 produce pulses which switch the R–F transmitter 66 on for the corresponding pulses, and accordingly energy is radiated by antenna 45. It is contemplated that R–F frequencies high in the microwave region, say 16,000 megacycles, will be employed so as to obtain a highly directive beam with a reasonable size antenna, and that the pulse transmissions will be quite short—a fraction of a microsecond.

Separate antennas and coding equipment are employed for the three sites, and it is contemplated that all three R–F transmitters will operate at substantially the same frequency. The pulse modulators for site 1 and the localizer site may be arranged to provide identification pulses as described in connection with FIG. 4. Proper synchronizing and phasing of the three scanning beams may be obtained in any suitable manner, as by employing synchronous motors driven from a common A.-C. power line.

Figure 6:
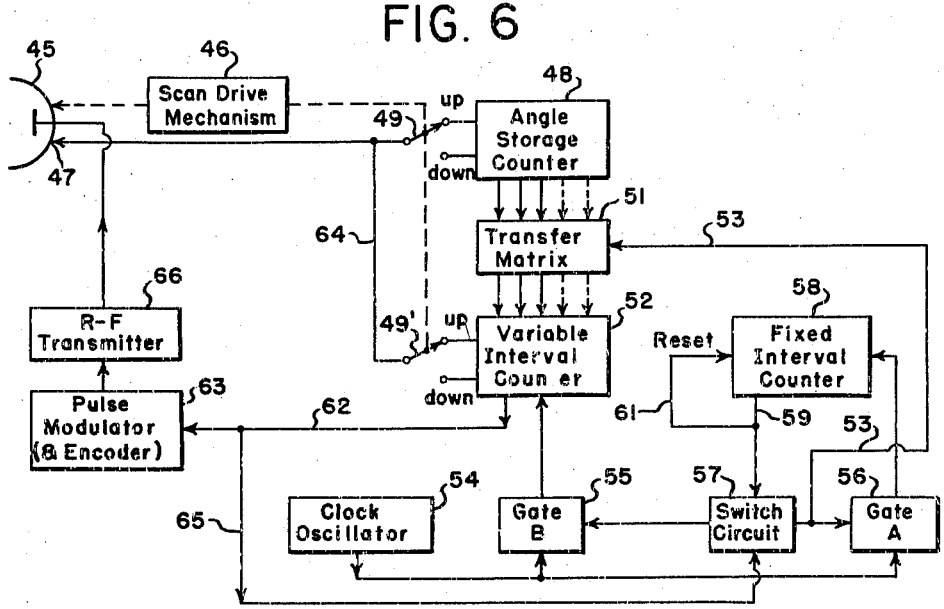
FIG. 6 is a block diagram of a digital coder.

In the case of the localizer beam the "up-down" switching shown in FIG. 6 will be modified somewhat. As described, the angle storage counter 48 counts from 0° to the maximum angle, and then counts down as the angle decreases to zero. For the localizer beam, the count will begin at the mid-position of the antenna, count up in either direction, and count down as the beam returns to its mid-position. Switches 49, 49′ will then function as "out-in" switches. A control signal may be sent from the antenna or the drive mechanism to the pulse modulator so as to change the identification coding interval for left and right movements or, preferably, the count in 48 corresponding to mid-position is employed for the purpose.

A numerical example will be given in further explanation of the operation of the circuit of FIG. 6, it being kept in mind that this is for illustration only. Assume that the coding is for rear elevation beam $b$ at site 2 and that the numerical values mentioned in connection with FIGS. 3 and 4 apply. With sinusoidal movement at the rate of 5 cycles per second and the beam transmitted only during the central 60° of respective half cycles, a single scan (either up or down) will take place in 1/30 second and during this interval the beam will move from 0 to 20°, or vice versa. With antenna pickup pulses each 0.01°, 2,000 pulses will be generated per scan. Accordingly the average pickup PRF will be 60 kc. and the average pickup pulse interval will be 16.7 microseconds. Due to the sinusoidal movement, however, the pickup pulses will not be evenly spaced in time. Near 0° and near 20° the interval will be approximately 18.4 microseconds, and near 10° the interval will be approximately 15.9 microseconds.

A total time variation in transmitted pulse spacing of 80 microseconds corresponds to 20° scanning range, and accordingly a change of 0.04 microsecond corresponds to a 0.01° change in angle. The oscillator 54 may be designed to provide pulses at a 25 megacycle PRF, giving 0.04 microsecond timing intervals.

A minimum spacing of 16 microseconds is employed for beam $b$. Thus the fixed interval counter 58 may be arranged to count 400 oscillator timing pulses before the switch to the variable interval counter 52 takes place. The variable interval counter will be counted down at the rate of one count per each 0.04 microsecond. Thus when the antenna beam is at 10°, with 1000 counts transferred to the variable interval counter 52, it will take 40 microseconds for the count-down. This, plus the fixed interval of 16 microseconds, gives an output pulse through line 62 which is 56 microseconds after the previously transmitted pulse, corresponding to the mid-point 25 in FIG. 3. With the antenna at 20° and 2000 counts in the variable interval counter, it will take 80 microseconds for the count-down, thus yielding an overall interval of 96 microseconds as shown at 27 in FIG. 3.

Near 0° the fixed interval counter 58 must reset very rapidly since only a few counts may be required from the variable interval counter before the fixed interval is counted again. To relax the requirement for speed of reset, the fixed interval counter may be arranged to count somewhat less than 400, say 376, and the variable interval counter 52 arranged to add 24 to each count transferred from 48. Thus an interval of 0.96 microsecond corresponding to 24 timing pulses will always be available for resetting the fixed interval counter.

It should be understood that in the embodiment of FIG. 6 proper transmission of angular information is obtained regardless of the speed of scan, since the actual beam angle is employed to determine the interval between successive pulses. If the antenna stopped, the transmitter would repeatedly transmit the then-existing beam angle. This is preferred, but if desired the beam angle pulses could be derived on a time basis related to the scanning speed.

It will be noted that the encoded value correctly represents the beam angle at the instant of transmission to within 0.01°. At angles near 0°, the time required to encode the angle of beam $b$ is slightly less than the time required for the antenna to scan through an increment of 0.01°, so that an aircraft will receive angular information which, assuming perfect decoding, will give its angular position within 0.01° and frequently enough so that changes of 0.01° are accurately reflected in the decoded signal. At larger angles the encoding time is greater so that angular information is not transmitted as frequently. Using specific figures, at 5° new data is transmitted every 0.022° change in beam angle, at 10° every 0.035° change, and at 20° every 0.058° change.

For elevation beam $a$ and azimuth beam $c$, the minimum coding interval of 56 microseconds allows the transmission of angular data near 0° for each 0.03° beam angle increment. If necessary, the minimum coding intervals for these beams could be reduced so as to permit more frequent transmission of data.

Certain changes in detail may be made in coding beams $a$ and $c$. For beam $c$, assuming angle pickup pulses each 0.01°, the 10° excursion gives 1000 counts. The fixed interval counter may be designed to count the 56 microsecond minimum interval, or it could be left to count 16 microseconds and the storage or variable interval counters arranged to start at 1000 and count to 2000. For beam $a$, a range of 40 microseconds is allotted to a 20° excursion, corresponding to 1000 counts at the assumed timing pulse interval of clock oscillator 54. If the timing interval is kept the same, the angle increment pulses may be arranged to occur at 0.02° increments, either by changing the angle scale or by eliminating alternate 0.01° pulses.

Using integration, the average transmitted PRF during a single scan of beam $b$ is about 22.4 kc. For beams $a$ and $c$ which have pulse pairs, the average PRF is about 26.9 kc. These PRF's are sufficiently close to allow similar transmitting equipment to be used, and are sufficiently low to avoid undue difficulties in transmitter design.

The scanning beams are decoded in an aircraft receiver to provide angle data with respect to each beam site, and the angle data then used to compute a desired landing path.

Figure 7:
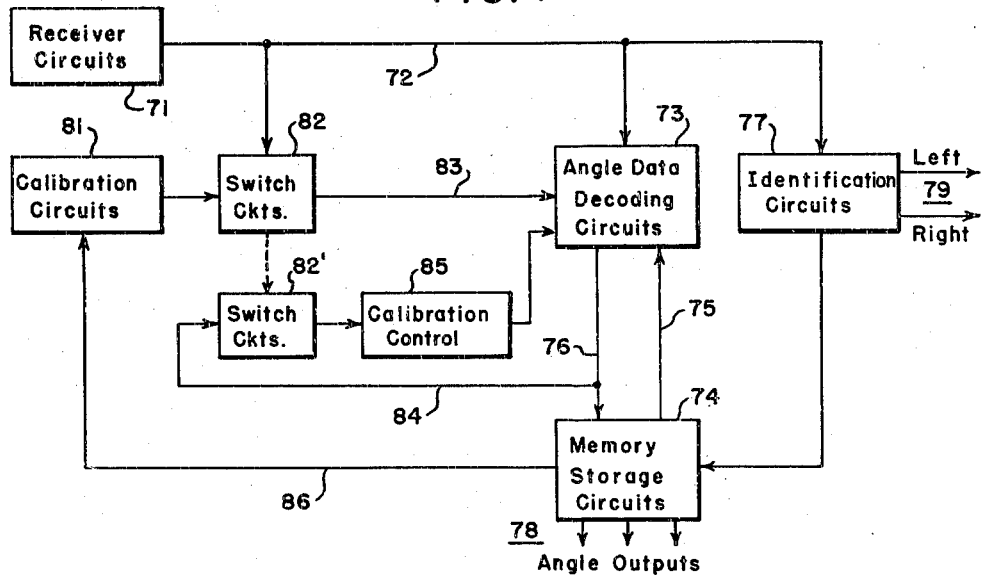
FIG. 7 is a simplified block diagram of an airborne decoding receiver.

FIG. 7 is a simplified block diagram of an airborne receiver which will be described in more detail in connection with FIG. 8. As shown, the receiver of FIG. 7 performs three main functions, namely, (1) the decoding and storage of the angle data from each beam site, (2) the identification of the beams as they are received, and (3) the calibration of the decoding circuits in the intervals between beam passages over the aircraft.

Receiver circuits are shown at 71 for receiving the spacing between the pulses of each pair is the same and selected to permit ready identification, say 13 microseconds. The spacing of the pulse pairs increases with the angle, and the minimum spacing at the left is greater than in FIG. 4(A), as described above.

With the identity spacing accurately maintained, angle decoding can be between first pulses 29, or between second pulses 30, or even between the second pulse of one pair and the first of the next, etc. In the embodiments described hereinafter angle decoding will be between first pulses, and for convenience these will occasionally be referred to as the "angle" pulses, the second pulses being the "identity" pulses.

FIG. 4(C) shows the coding of the localizer beam $c$ where the spacing of the angle pulses 31 is a minimum at 0° and increases in both left and right directions. The angle pulses are accompanied by identification pulses 32 and 33 for left and right positions. The interval between the pulses of a given pair is different for left and right positions, say 12 and 11 microseconds, respectively.

Figure 5:
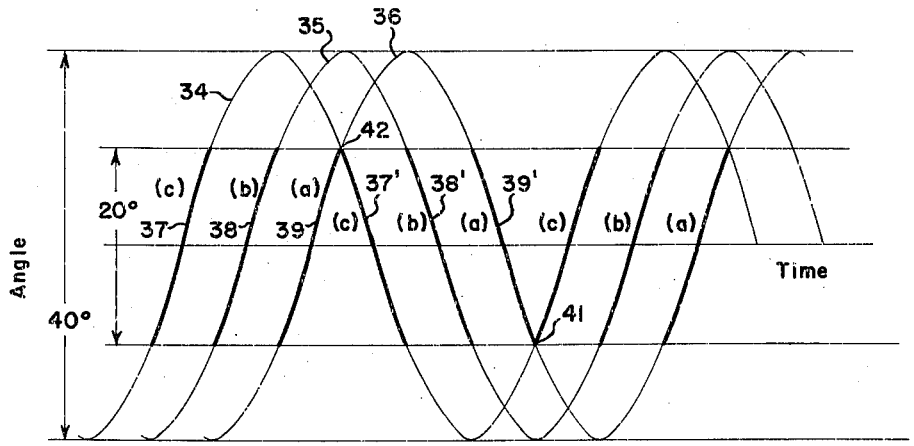
FIG. 5 illustrates a suitable antenna scanning procedure.

Referring to FIG. 5, a suitable beam scanning pattern is illustrated. An approximately linear variation in angle with time is commonly desirable, but a true linear variation is not essential. As here shown, each antenna movement is approximately sinusoidal, and the most linear portion is selected for beam transmission.

The localizer antenna is assumed to be oscillating horizontally as shown by curve 34, and the antennas from sites 2 and 1 oscillating vertically as shown by curves 35 and 36. Heavy lines 37, 38, 39 and 37', 38', 39' represent the portions of the oscillations during which the respective beams are transmitted. Scans 37–39 represent movements in one direction, say up for the elevation beams and left to right for the localizer beam, and 37'–39' represent movement in the opposite directions. As will be observed, by phasing the sinusoidal oscillations so they are 60° apart and using half the total amplitude of excursions, as one beam ceases to be transmitted the next one starts.

It is advantageous to select the beam scanning sequence so that there will be a considerable interval between the passage of one beam over the aircraft and the passage of the next (different) beam thereover, particularly as the aircraft approaches a proper landing path. This can be accomplished by arranging one elevation scan to next succeed the other in one scanning direction, with an azimuth scan interposed between an elevation scan in one direction and a reversal of the other elevation scan. This avoids an elevation scan in one direction, say up, being immediately followed by another elevation scan in the opposite direction, say down, where an aircraft at either angle extreme could receive the elevation beams in quick succession, or possibly simultaneously.

If an aircraft is at a high angle to site 1 it will commonly be at a substantial angle to site 2, and if at a low angle to site 1 it will be at a low angle to site 2. Thus with the sequence of FIG. 5 beams $a$ and $b$ will not be received at the same time or in close succession. If an aircraft is at a low angle to sites 1 and 2, it should be aligned with the runway so that beam $c$ will not be received simultaneously or in close succession with either $a$ or $b$. Thus a position such as shown at 41 is highly unlikely to occur. Conceivably an aircraft could be at a 20° elevation with respect to beam $a$ and at the 10° extreme of beam $c$ as shown at 42, but this is not likely to occur in practice and the position will change rapidly as the aircraft lines up with the runway.

If desired, a different sequence may be employed, as well as a different detailed scanning pattern.

FIG. 6 shows a suitable arrangement for coding the scanning beams, using digital techniques. An overall system accuracy of the order of 0.05° is considered desirable, particularly in the final stages of landing. For many situations less accuracy may be satisfactory. Since there may be unavoidable inaccuracies in decoding and calculating the desired landing path, it is considered desirable to transmit angular information with an accuracy of the order of 0.01°.

Referring now to FIG. 6, an antenna 45 is shown diagrammatically, driven by a scan drive mechanism 46. Here the antenna is assumed to move bodily but other arrangements are possible, such as moving the feed line through successive positions to produce an equivalent result. The scan drive mechanism is designed to change the beam angle approximately sinusoidally. A suitable pickup 47 is arranged to produce an angle increment pulse for each 0.01° of movement. Different types of pickups may be employed, such as photoelectric, magnetic, etc. and may be arranged to operate either directly from the antenna movement or from the scan drive mechanism. As an example, a ruled strip may be arranged in the arc of a circle about the axis of rotation of the antenna, and a photoelectric pickup arranged to derive signals from the ruled lines.

If desired, pulses may be produced by pickup 47 at, say, 0.02° angle increments, and doubled to give pulses corresponding to approximately 0.01° increments. Or, the pulses may have a duration approximately one-half the pulse intervals and the leading and trailing edges used to give pulses of one-half the initial pulse intervals, etc.

The pulses from pickup 47 are supplied to an angle storage counter 48. For beam $b$ and a total angle of 20°, 2000 pulses will be delivered to the counter during a scan in one direction. Consequently an eleven-stage binary counter, capable of counting to 2047, may be employed. A switch 49, actuated by the scan drive mechanism, is provided for up and down directions of movement, so that counter 48 counts up for one direction and counts back down when the direction reverses.

The stored count is transferred periodically to a variable interval counter 52 by transfer matrix 51 controlled by a signal applied through line 53.

A clock oscillator 54 is provided which is capable of delivering short timing pulses at a highly stable PRF. Advantageously a crystal controlled oscillator is employed for stability. The timing intervals are short compared to the intervals between pulses from pickup 47. The output of the oscillator is supplied to gates B and A shown at 55 and 56, respectively. Switch circuit 57 determines whether the oscillator pulses will be passed through one gate or the other. The switch circuit 57 and the gates 55 and 56 are arranged to switch from one condition to another in a very short time interval.

It will be remembered that a certain minimum time interval is employed in the transmission of angle information. Accordingly, initially the switch circuit opens gate A and pulses from oscillator 54 are supplied to a fixed interval counter 58. The latter counts the necessary number of timing pulses to correspond to the selected minimum interval, and then delivers an output pulse through line 59 to the switch 57, which closes gate A and opens gate B. At the same time, the output pulse resets counter 58 through line 61.

At the initial opening of gate A by switch 57, a signal is supplied through line 53 to the transfer matrix 51, thereby transferring the then-existing count in counter 48 to the variable interval counter 52. When gate B opens, pulses from oscillator 54 are supplied to counter 52 to reduce the count thereof. When the count is reduced to a selected value, say zero, counter 52 supplies an output pulse through line 62 to the pulse modulator 63.

As the count in 52 is reduced, another angle increment signal may be produced by pickup 47. Since the transfer matrix 51 has been turned off upon switching from gate A to gate B, such a pulse is supplied through line 64 to the counter 52 to increase the count thereof.

As soon as an output in line 62 has been delivered to the pulse modulator, the output is supplied through line 65 to switch circuit 57 to restore it to its initial condition, and the operation repeats.

beam transmissions and yielding video pulses in line 72 corresponding to the beam pulse modulations. The video pulses are supplied to angle data decoding circuits 73 which respond to the pulses in a given beam passage and produce a corresponding angle signal which is supplied to a memory storage circuit in 74. As actually designed, any previously stored signal in unit 74 is supplied to unit 73 through line 75 for comparison with the new data, and an error signal, if any, is supplied to the storage unit through line 76 to correct the previously stored signal.

Video pulses are also supplied to identification circuits 77 which determine which beam is being received during a given passage. The outputs of the identification circuits are supplied to the memory storage circuits 74 so that the angle data for each beam is separately stored. Thus, unit 74 provides three angle outputs 78 representing the angle of the aircraft from each of the three sites. The identification unit 77 also provides left-right outputs 79 corresponding to azimuth angles on opposite sides of the center line of the runway.

Calibration circuits 81 provide a plurality of test pulse signals and corresponding calibration angle signals for checking the operation of the decoding circuit 73, and providing a correction when required. Switch circuits 82, 82' are controlled by video pulses in line 72 and arranged to switch to the normal decoding mode during beam passages, and to the calibration mode therebetween.

During the calibration intervals signals from the calibration circuits 81 are supplied through switch 82 and line 83 to the decoding circuits 73. If the angle signal for the test pulses does not correspond exactly to the calibration signal, a corresponding error signal will be produced in line 76 and fed through line 84 and switch circuits 82' to a calibration control circuit 85. The latter makes an appropriate adjustment in the angle data decoding circuits 73 until the error in line 76 is reduced to zero.

Advantageously the test pulse series and calibration voltage which correspond most clearly to the angle of the beam which is next to pass over the aircraft are selected for calibration, and the selection is controlled automatically by supplying the corresponding stored signal from unit 74 through line 86 to the calibration unit 81.

Figure 8:
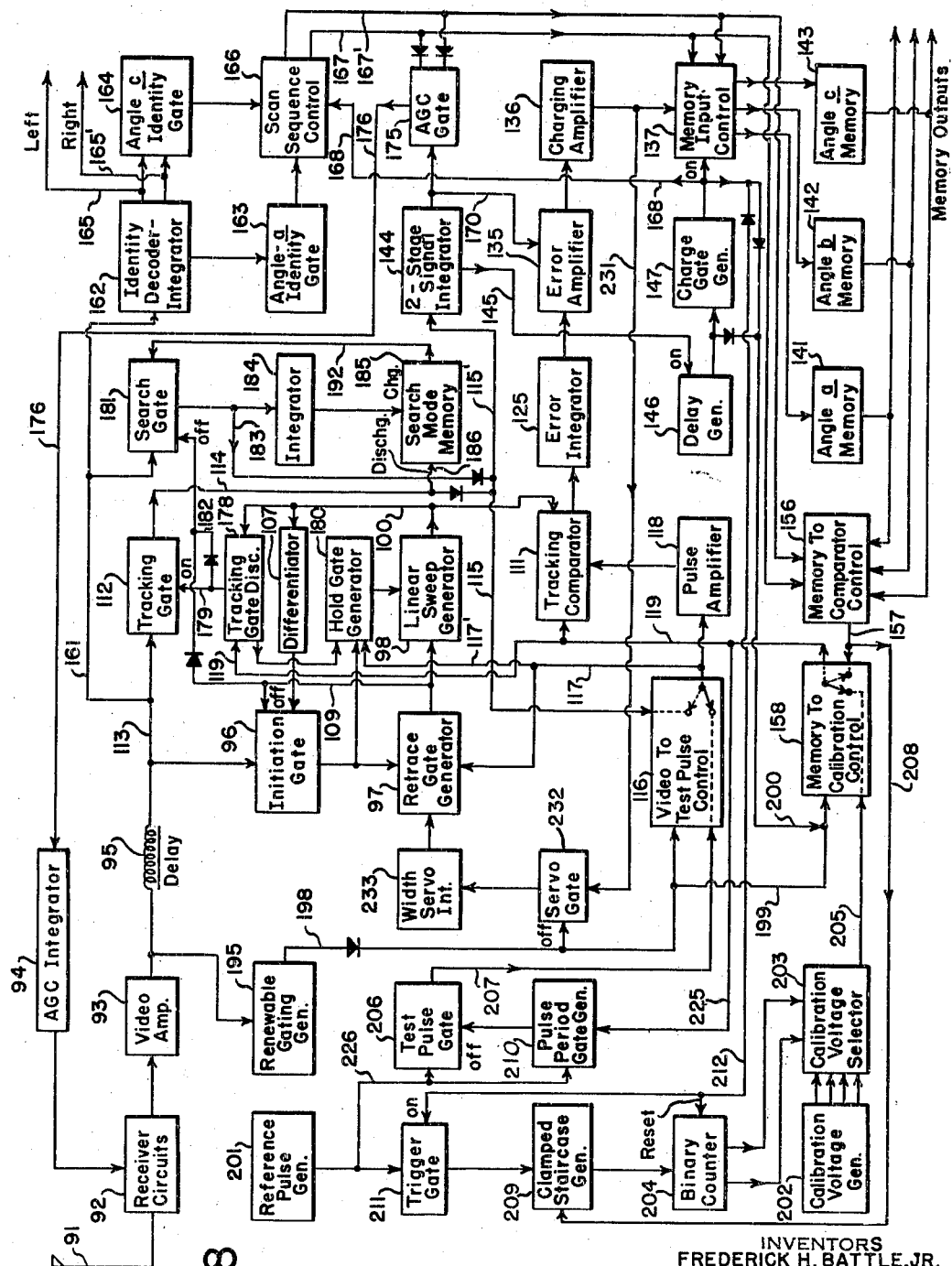
FIG. 8 is a more detailed block diagram of the receiver of FIG. 7.

Referring now to FIG. 8, a detailed receiver for decoding the beam transmissions is shown. Some of the circuit components are similar to those described in our above-identified application and will therefore be described somewhat more briefly herein. However, many added features are provided which will be apparent as the description proceeds.

Signals from all three beams are received successively by antenna 91 and supplied to receiver circuits 92 which may be of a superheterodyne type including a mixer, local oscillator, IF amplifier and detector. The detected output is supplied to video amplifier 93. An AGC signal from unit 94 is employed to control the receiver gain.

The video pulses are slightly delayed by delay line 95, for a purpose described hereinafter, and then supplied to an initiation gate 96. Initially this gate is open and supplies the initial pulse of a beam passage to a retrace gate generator 97. The retrace gate is supplied to a linear sweep generator 98 to return the sweep to its starting position and hold it thereat for an interval greater than that between the angle pulses and respective identification pulses. With the numerical values here assumed, wherein the maximum identification interval is 13 microseconds, the retrace gate may be designed to hold off the initiation of the linear sweep for, say 16 microseconds corresponding to the minimum angle coding interval of any of the beams.

Figure 9:
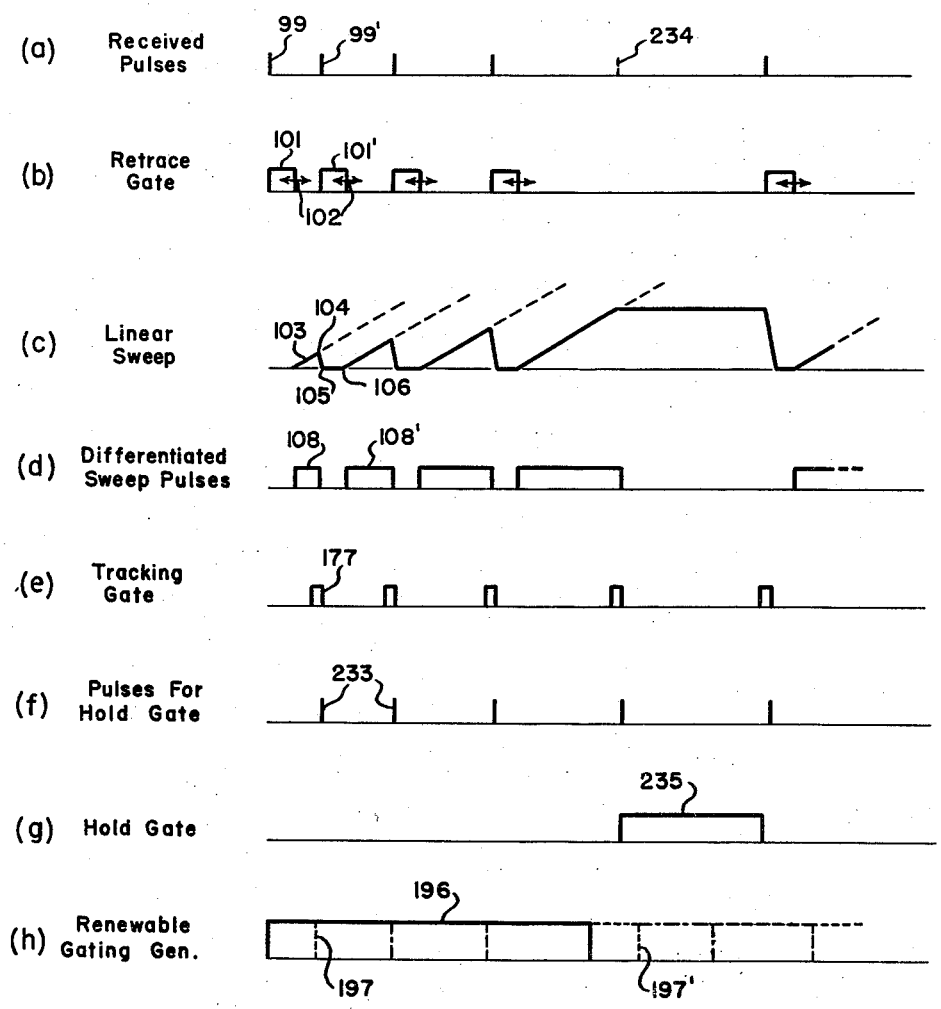

FIG. 9(a) illustrates a series of pulses in line 113, received from beam b. The beams from other sites will have accompanying identification pulses. FIG. 9(b) shows retrace gates 101 which start at the instant of reception of respective pulses 99, 99', etc. and continue for the selected interval, say 16 microseconds. The duration of the retrace gate may be varied by the calibration circuit as will be described hereinafter. In the figure this is shown by arrows 102.

At the termination of the retrace gate 101 the linear sweep 103 begins. When the second pulse 99' arrives, the leading edge of gate 101' stops the linear sweep as indicated at 104, whereupon the sweep retraces to its initial value 105. The sweep is held at its initial value until the end of gate 101', whereupon the sweep starts its next linear rise at point 106.

As the intervals between successive received pulses increase, the linear sweep will rise to higher and higher values before it is cut off. Consequently, successive sweep amplitudes correspond to successive beam angles.

Returning to FIG. 8, the sweep output of 98 is supplied to a differentiating circuit 107 which produces pulses 108, 108', as shown in FIG. 9(d), equal in duration to the respective sweeps. The pulses are supplied to the initiation gate 96 to turn it off, as indicated. The retrace gates from 97 are also supplied to gate 96 through line 109, to turn it off. Consequently, after the initiation gate has passed an initial video pulse to retrace gate generator 97, it is switched off for the duration of the retrace gate and the following linear sweep so that no additional video pulses can pass therethrough. This prevents identification pulses from actuating the retrace gate, as well as any extraneous pulses that may be received.

The output of the linear sweep generator 98 is supplied to tracking comparator 111 which participates in establishing an angle memory voltage, as will be described later.

It is desirable to prevent, insofar as possible, actuation of the decoding circuits by extraneous pulses unrelated to the beam transmissions. Accordingly a tracking gate 112 is provided which is closed except for a short interval bracketing the expected time of arrival of the next video pulse. The control of the tracking gate will be described later. For the moment it will be assumed to be open as the next pulse 99' arrives. This pulse will be supplied from the video amplifier through line 113 and thence through line 114 to line 115.

In line 114, and in other interconnecting lines, diodes are shown. These are to insure that signals will pass only in one direction, to prevent undesirable circuit interactions, etc. They may be inserted elsewhere in the circuit when required. Since the use of diodes for these purposes is well known to those skilled in the art, they will not usually be referred to hereinafter.

Line 115 is connected to a video-to-test pulse control unit 116, which permits changing from tracking to calibration operations, and vice versa.

For convenience of explanation, a switch is shown within the unit 116, but it will be understood that electronic switching circuits will commonly be employed. The tracking position is shown dotted, and accordingly pulse 99' will pass through line 117 to the retrace gate generator 97, to initiate retrace pulse 101' as shown in FIG. 9(b). Accordingly, the linear sweep is terminated and retraces to its initial condition, as previously explained. Termination of the linear sweep terminates differentiated pulse 108, but the initiation of retrace gate pulse 101' continues to hold the initiation gate 96 closed so that no video pulses can pass therethrough.

As successive pulses arrive, the operation is repeated and corresponding sweep amplitudes are obtained from generator 98 which represent successive angles of the beam as it passes over the aircraft.

Successive received pulses pass through control unit 116 to the pulse amplifier 118 and thence to tracking comparator 111. Any previously stored angle memory signal will also be supplied to the tracking comparator through line 119, as will be described hereinafter. Comparator 111 functions in a manner similar to that described in our above-identified application, but there are certain differences which will be described by reference to FIGS. 11 and 12.

FIG. 11 shows a differential amplifier including triode sections 121 and 122 whose grids are supplied with voltages from the sweep generator and from the memory circuit through line 119. The cathodes are connected together and lead through a cathode resistor 123 to a suitable bias supply denoted $V_C$. The video pulses from pulse amplifier 118 are applied in the cathode circuits. The anode circuits include load resistors, and the differential output is supplied through lines 124 to an error integrator 125 (FIG. 8).

FIG. 12(a) shows a beam envelope 126 as it passes over the aircraft, containing successively received angle pulses 99. In practice there will be a large number of pulses within envelop 126, but only a few are shown. Also, their spacing will vary slightly, but this is impractical to illustrate.

In FIG. 12(b) the sawtooth waves 127 represent successive outputs of the linear sweep generator as applied to the grid of triode 121. The envelope of the peak voltages will rise very nearly linearly, as shown by dotted line 128. Line 129 represents the memory voltage applied to the grid of triode 122. The division of current between the two triode sections 121, 122 will depend on their respective grid potentials. Inasmuch as pulses 99 occur at the peaks of the sweeps 127, the differential amplification of the pulses will be determined by the difference between lines 128 and 129, and will change in polarity at the point of crossover 131.

Accordingly, the video pulses applied to the cathodes will be amplified by different amounts and the difference therebetween will appear in the output circuit 124, as illustrated in FIG. 12(c), if the memory voltage is correct. When the grid potentials are equal, as shown at point 131, the differential output will be zero regardless of the amplitude of the input pulses, as shown at point 132. At the skirts of beam 126 the pulses will be very small and consequently will appear small in the output, as shown at points 133, 133'. In between, the output pulses will vary in amplitude as a function of their input amplitudes and the differential gain of the amplifier. Their polarity, however, will depend on whether the peak inputs from the sweep generator are below or above the previously stored memory voltage.

Consequently, when the output in lines 124 is integrated, the resultant will be zero when the positive and negative areas in FIG. 12(c) are equal. If, however, the memory signal is not correct, as illustrated by dotted line 129', the output in lines 124 will have unequal positive and negative areas as illustrated in FIG. 12(d). Accordingly, the integrated output will have a D.-C. value as illustrated by line 134. The integrated output will thus represent the error between the previously stored memory voltage and the average (beam center of gravity) value which should exist, both in amplitude and polarity.

FIG. 12 illustrates a condition where the beam angle is increasing, as during an upward scan. If the beam angle is decreasing, the envelope 128 of the sweeps will slope in the opposite direction.

Due to the slight non-linear spacing of pulses in a beam width, the center of gravity of the beam will differ slightly from the center of a symmetrical beam envelope and this can be taken into account in initial calibration if necessary.

Returning to FIG. 8 the integrated error signal produced in 125 is supplied through error amplifier 135, charging amplifier 136, and a memory input control circuit 137 to the proper angle memory circuit 141, 142 or 143. Circuit 137 is controlled from the identification decoder, as will be explained.

From the explanation of the tracking comparator operation it will be realized that the integrated error signal will have its correct value only after the beam has passed over the aircraft. Accordingly, a delay in supplying the error signal to the memory circuits is introduced. The video signal is fed through line 115' to a two-stage integrator 144. The first stage has a relatively short integration time constant, so that only a few received pulses are necessary to build up a voltage which is supplied through line 145 to delay generator 146. This may be a delay multi-vibrator. The delayed output signal is supplied to charge gate generator 147 which controls the opening of the memory input control 137.

The relationships are illustrated in FIG. 10. Here FIG. 10(a) shows beam envelopes 151, 152, 153, corresponding to successive received beams c, b, a. Ordinarily there will be a much longer time interval between the beams than illustrated, so breaks are shown in the time axis. The output of the first stage of signal integrator 144 is illustrated in FIG. 10(b). The first few pulses in a given beam are rapidly integrated as shown at 154. Since the signal is used for switching purposes, the leading edge is most important and the remainder is shown dotted. The leading edge 154 triggers the delay generator 146, as described, and the latter triggers a delayed gate 155 in the charge gate generator 147. Gate 155 starts slightly after the respective beam has passed over the aircraft.

Returning to FIG. 8, after a beam has passed, the charge gate generator 147 will open the memory input control circuit 137 to allow the error signal to be supplied from charging amplifier 136 to one of the memory circuits 141–143. Amplifier 136 is preferably of the "constant current" type, and accordingly the respective memory voltage is corrected so that the stored value accurately represents the then-existing angle of the aircraft to the beam site.

In order to supply the proper memory signal to the tracking comparator during a beam passage, the outputs of memories 141–143 are supplied to a memory-to-comparator control circuit 156. This is a switch circuit controlled by the identity circuits so that the proper memory signal is supplied to line 157. This output is then supplied through the memory-to-calibration control circuit 158 (dotted switch position) and line 119 to the tracking comparator 111 so that the stored memory voltage can be compared with the sweep generator output as described in connection with FIGS. 11 and 12. Circuit 158 is a switch circuit similar to circuit 116, but the control is different as will be described.

As arranged herein, the sweeps from generator 98 have the same slope for all three beams, but given video pulse intervals in general correspond to different angles in the three beams. Thus the correlation between memory signal and beam angle will be different for the three beams. This can be taken into account in using the angle information for calculating a landing path.

Describing now the identification circuits, the output of video amplifier 93 is supplied through lines 113 and 161 to the identity decoder-integrator 162. This may include a delay line tapped at 11, 12 and 13 microsecond points, corresponding to the identification coding intervals, with the input and tapped signals fed to coincidence detectors and integrators to produce corresponding outputs. Thus an output signal is fed to the angle-a identity gate 163 when the 13-microsecond coding interval indicates that that beam is being received. Similarly, outputs are supplied to the angle-c identity gate 164 for 12 and 11 microsecond spacings corresponding to left and right positions of the azimuth beam. Left-right signals are also supplied to output lines 165, 165' for use in subsequent calculating circuits.

The outputs of identity gates 163, 164 are applied to a scan-sequence control circuit 166 which gives output signals in lines 167, 167' depending upon whether the gate signal comes from gate 163 or 164. No output signal is required for angle b which does not have identification pulses. Control circuit 166 may be an electronic switch circuit arranged to give either of two outputs, or no output, as required.

In this embodiment it is desired to switch circuits from those corresponding to one beam to those corresponding to the next only after the first beam has passed and all tracking functions pertaining to that beam have been accomplished. Although it would be possible to design identity gates 163, 164 to supply suitably delayed outputs to the scan sequence control circuit, as here shown the outputs from the gates are used to precondition control circuit 166 for the switching operation, and the actual switching is produced at the trailing edge of gates 155 (FIG. 10) from the charge gate generator 147.

FIG. 10(e) illustrates the integrated outputs of the identity decoder-integrator at 171 and 172, for respective beams c and a. The integrated signals are passed to identity gates 163, 164 to produce gates 173, 174, respectively, as shown in FIG. 10(f).

The output of generator 147 is supplied through line 168 to the scan sequence control circuit 166. The gates 155 may be differentiated in 166 to produce short transients 169 at their trailing edges, as shown in FIG. 10(d). The outputs 173, 174 of the identity gates terminate somewhat later than transients 169, and may be arranged to produce biases in control circuit 166 which, upon the arrival of transients 169, cause corresponding outputs to be produced in lines 167, 167'. In the absence of a gate from either 163 or 164, the arrival of a transient 169 actuates circuit 166 to the no-output condition.

The design of suitable switching circuits to perform the above-described operation will be clear to those skilled in the art.

When a transient 169 is produced at the trailing edge of a charge gate 155, the correction of the memory circuit corresponding to the beam which has just passed over the aircraft will have been completed. Accordingly, the output in one of lines 167, 167', or no output in either line, is used to condition the memory input control circuit 137 ready for the next beam passage. This is illustrated in FIG. 10(d). After beam c has passed, the memory input control circuit 137 is conditioned for the reception of the next beam b. After that beam has passed, it is conditioned for the reception of the following beam a, etc.

Lines 167, 167' are also connected to the memory-to-comparator control circuit 156 so as to deliver the proper memory voltage from one of units 141–143 through line 157 and control unit 158 to the tracking comparator 111 for comparison with the sweep voltages generated during a beam passage, as above described in connection with FIGS. 11 and 12.

The strength of signals received in an aircraft from the several ground sites will vary over a wide range during the approach and landing maneuver. Accordingly, a good AGC system is desirable to minimize the dependence of measurements on the shapes of the scanning beams. Also, the threshold beam widths seen by the decoding circuits should preferably be limited, say between 10-db or 20-db down points, to avoid the effect of any side lobes, shoulders, or reflected signals that may occur.

In the arrangement of FIG. 8 the AGC signal is developed from beam b and used to control the gain of the receiver circuits for all three beams. The output of the two-stage signal integrator 144, which corresponds to the integrated beam envelope, is supplied to the AGC gate 175. Lines 167, 167' are connected to gate 175 and the gate circuit is arranged so that the gate is open during the passage of beam b, but closed during the passages of beams a and c. Accordingly, the integrated signal corresponding to beam b is passed through line 176 to the AGC integrator 94, and used to control the receiver circuits 92.

The AGC gate 175 could be controlled so that the AGC action is obtained by the reception of one of the other beams, if desired. Also, if necessary, a switched AGC circuit could be employed so that AGC reference levels are stored for each of the three beams and used during respective passages. An arrangement of this nature is described in our above-identified application.

The output of integrator 144 may also be applied through line 170 to the error amplifier 135 to control the gain thereof. Since the integrated output for each beam passage will be applied to the error amplifier at the time the error signal for that beam is used to correct the corresponding memory, this normalizes the error signal amplitude to obtain a constant beam center-of-gravity weighting function. Or, the output of integrator 144 may be fed to charge gate generator 147 to control the duration of gate pulses 155 to obtain a similar result.

Considering now the tracking gate feature, it is desirable to discriminate as much as possible against the effects of any interference or noise that may be present. After a tracking condition has been established, this may be facilitated by rendering the angle data recovery circuits effective only during a short interval bracketing the expected time of arrival of the next angle pulse. As above described, the initial pulse in a beam traversal passes through initiation gate 96 to start the angle decoding operation. Thereafter, if pulses continue to be received, gate 96 is maintained closed. However the subsequent angle pulses pass through tracking gate 112 to continue the data recovery operation.

The tracking gate pulses are illustrated in FIG. 9(e). As shown, gate pulse 177 starts just prior to the expected time of arrival of pulse 99', and terminates somewhat thereafter. The gate pulses may be obtained by comparing the linear sweep voltage that results from each video pulse with the memory voltage previously stored for that beam. Due to the relatively high scanning rate, the angle of the aircraft with respect to a given site will change only slightly between successive traversals by a given beam. Thus the memory voltage for one traversal will represent approximately the pulse intervals during the next traversal.

The comparison is made in a tracking gate discriminator 178, which may be a circuit similar to that shown in FIG. 11, with sweep and memory voltages applied to respective grids of the triode sections. No cathode injection is required, and the circuit may be designed to yield a pulse output for each sweep during the interval the sweep differs from the memory voltage by less than a selected amount or, in general, when the output of the sweep generator 98 is within a predetermined range with respect to the memory voltage.

For example, if the sweep range is 20 volts in 80 microseconds, the selected difference may be +0.5 volt corresponding to +2 microsecond. Gate pulse 177 will then start 2 microseconds before the next video pulse is expected, and will end 2 microseconds thereafter if the pulse does not arrive. If the video pulse does arrive, the sweep will start its retrace and the gate pulse will terminate as the retrace voltage falls 0.5 volt below the memory voltage.

The sweep voltage is applied through line 100 to discriminator 178, and the memory voltage is supplied thereto through line 119. The resultant gate pulses 177 are supplied to tracking gate 112 through line 179 to open the gate for the duration of pulses 177.

In addition to discriminating against noise and random interference, with a sufficiently narrow tracking gate, only one pulse of a given pulse pair in beams a and c will be passed through the gate. Also, in case the beam is reflected from the ground or objects within the beam scanning sector, no false angular information will be obtained so long as reflected pulses arrive outside of the tracking gate. This further assures reliable operation.

Occasionally it may be found that a video pulse will not be received, due perhaps to misfiring of the transmitter or for other reasons. In such case the linear sweep will continue to rise until it reaches saturation or a subsequent pulse stops it. Thus, the amplitude of the sweep applied to tracking comparator 111 may be considerably higher than it should be, and cause a somewhat erroneous tracking error signal to be developed. The effect of one or more missing pulses will depend on when they should occur, and any error is minimized by the integration in 125. However, if the sweep continued, the next tracking gate pulse would occur at an incorrect time and might prevent passage of the next video pulse.

Accordingly, a hold gate generator 180 is connected to sweep generator 98 to stop the sweep whenever a hold gate signal is applied, as by using the hold gate to disconnect the source of charging current in the sweep generator. Generator 180 is supplied with the tracking gate pulses from discriminator 178 and arranged to generate a hold gate beginning at the trailing edge of the tracking gate.

The operation of hold gate generator 180 is inhibited by the arrival of a video pulse from the initiation gate 96 or through line 117'. The period of inhibition may be a few microseconds long so that, if a video pulse arrives as expected, the hold gate will not be generated upon termination of the tracking gate.

The operation is further illustrated in FIG. 9(f) where pulses 233 are produced in generator 180 at the trailing edges of the tracking gate pulses 177. It is assumed that the first four video pulses in FIG. 9(a) have been received and have inhibited the operation of generator 180 so that no hold gate is produced. However, if a video pulse is missing, such as shown by the dotted line 234, the hold gate generator will not be inhibited and a pulse will be generated as shown at 235. This will persist until the arrival of a subsequent video pulse terminates the gate through the inhibiting circuits. Thus, upon arrival of the subsequent video pulse the sweep voltage will be only slightly greater than it should have been, and little error will be produced in the comparator circuits.

When the sweep is stopped, the differentiated sweep pulse 108 to the initiation gate 96 terminates, allowing the next video pulse to pass therethrough even though the tracking gate is still not quite correct.

Before a tracking condition has been established and the memory voltages built up to the proper values, the tracking gate pulses 177 will not occur at the proper times for the reception of video pulses, since their time of occurrence corresponds to the angles represented by the memory voltages. To take care of this, search gate 181 is connected effectively in parallel with tracking gate 112. Until all three beams are tracked, search gate 181 is open except during the retrace and tracking gate intervals, wherein retrace and tracking gate pulses through lines 109 and 182 turn the gate off. When the gate is open, video pulses from line 161 pass to line 183 and thence to line 115.

Once the tracking condition is established for all three beams, the search gate is closed so that the interference immunity provided by the tracking gate is effective. To this end, video pulses passing through search gate 181 are supplied to integrator 184 designed to favor the rapidly recurring coding pulses but discriminate against random interference. The output of 184 is supplied to the search mode memory circuit 185. Video pulses passing through tracking gate 112 are also supplied to memory 185 through lines 114 and 186, and are integrated therein.

Memory 185 contains a storage circuit which is charged by the integrated pulses from the search gate, and discharged (or charged in the opposite direction) by integrated pulses from the tracking gate. Advantageously memory 185 is arranged so that the charging produced by an untracked beam is greater than the discharge produced by one or two tracked beams. However, when all three beams are being tracked, charging will cease and the discharges are arranged to overcome the previously established charge and develop a charge of opposite polarity. If the received beams are expected to be of different amplitudes, the corresponding video pulses may be brought to a common level before the charging or discharging of memory 185.

The operation is illustrated in FIG. 10(g) for beam c untracked and the others tracked. During the passage of beam c, the output of integrator 184 causes memory 185 to be charged along line 187, followed by a slow decay along line 188. Tracked beams b and a produce successive discharges of memory 185 each followed by slow decays along lines 189, 190, respectively. During the next passage of beam c, a charge will occur to yield a value represented by line 191. Once the third beam is tracked, no further charging will take place and successive discharges occur as shown by dotted lines 193.

The output of memory 185 in line 192 is arranged to close search gate 181 when the output exceeds a predetermined level in the tracking direction (negative in FIG. 10(g)) corresponding to the tracking of all three beams. The decays are selected so that, if tracking of one beam is lost, the memory output will fall below the predetermined level to reopen gate 181.

If desired, memory 185 may be controlled only by video pulses through tracking gate 112, preferably of standardized amplitude, and the level required to close gate 181 selected to correspond to the tracking of all three beams, an untracked beam resulting in the output falling below the required level. Or, separate memories and switch circuits controlled by the identity circuits could be employed so that search gate closing signals are developed independently for each tracked beam and switched to close the gate during corresponding intervals. For single beam reception, a signal for closing the search gate once the beam has been tracked may be developed in a similar manner.

A further alternative is to develop a search gate closing signal at the beginning of each beam passage which closes the gate for that passage only. Thus the first pulses through the tracking gate in the passage may be rapidly integrated to yield a signal which closes the search gate for the remainder of the passage. The sensitivity of the integrating channel may be made greater than the decoding channel so that the search gate is closed before the decoding circuits become effective.

Turning now to the automatic calibration feature of the invention, during operation changes in component values, tube characteristics, etc. due to changing temperature conditions, aging, etc. may affect the accuracy of the decoding. Accordingly, provision is here made to repeatedly recalibrate the decoding portions of the receiver to insure accuracy at all times.

With narrow beams, the time intervals during which the beams are sweeping over the aircraft will be small compared to the time intervals therebetween. For example, if the effective beam width is 0.5° and the total angular excursion 20°, no pulses will be received for better than 90% of the time. Accordingly, the intervals between passages of the beams over the aircraft are used for calibration purposes.

To perform this calibration, a source of accurately spaced pulses corresponding to a given angle is generated in the receiver and applied to the decoding circuits. A calibrated voltage corresponding to the memory voltage which should be produced by decoding the local generated pulses is also provided. The calibrated voltage is then used in place of the memory voltage in the decoding circuits and any resultant error used to produce a correcting effect in the decoding circuits. Although the correction may be applied at different points in the decoding circuit, it is here contemplated to change the duration of the retrace gate, thereby advancing or delaying the initiation of the linear sweep by the amount necessary to give the correct memory voltage.

Since different errors may occur in different parts of the angle range, it is advantageous to provide several different test pulse repetition frequencies and calibration voltages so that the accuracy can be checked and corrected at or near the then-existing angles of the aircraft with respect to the sites. The several PRF's can be provided by separate generators, if desired. However, in the present embodiment a single generator is employed which generates the highest PRF (smallest angle) for which it is desired to calibrate, and pulses are sequentially blanked out to obtain lower PRF's.

As here shown, the calibration circuit functions at all times except when a beam is passing over the aircraft. The circuit for switching from tracking to calibration and vice versa will first be described.

Referring again to FIG. 8, a renewable gating generator 195 is supplied with video pulses from amplifier 93. When a video pulse arrives, a gate is generated in 195 which has a duration at least as great as the maximum video pulse interval, or somewhat greater. For the 96-microsecond maximum interval here assumed, the gate may be, say, 200 microseconds long. The arrival of subsequent video pulses renews the gate so that a gate signal is generated throughout a beam passage. The operation is illustrated in FIG. 9(h) where the full line gate signal 196 is generated by the first pulse 99, the second pulse 99' renews the signal as shown by the dotted lines 197, 197', and additional pulses continue to renew the signal as indicated.

The gate signal is applied through line 198 to servo gate 232 to switch it off, and to the video-to-test pulse control circuit 116 to actuate the switch therein to the dotted position. Accordingly, the circuit for video pulses from line 115 to line 117, etc. is established, as previously described. In the absence of a gate from generator 195, control circuit 116 switches to the full line (calibration) position thereon, and servo gate 232 is open.

The gate from generator 195 is also supplied through line 199 to the memory-to-calibration control circuit 158 to move the switch therein to the dotted position. This delivers the memory signals from control unit 156 to line 119, as previously described.

Control units 116 and 158 and servo gate 232 are also supplied through line 200 with the outputs of the delay generator 146 and the charge gate generator 147, either of which will switch units 116 and 158 to their dotted positions, and turn gate 232 off. Since at least one of these outputs will exist from the beginning of the beam passage until the corresponding memory 141–143 has been corrected, units 116, 158 and gate 232 will remain in their decoding conditions throughout the time required for obtaining the angle information. Upon cessation of the charge gate from generator 147, these components switch to their calibration conditions.

Considering now the circuits for generating the test pulses and the calibration voltages, a reference pulse generator 201 is provided, generating pulses at, say, 16 microsecond intervals corresponding to 0° for beam b. The pulse spacing should be accurately controlled, and advantageously a crystal oscillator is used. By eliminating one, two or three intermediate pulses, longer intervals of 32, 48 or 64 microseconds may be obtained. A greater number of PRF's could be employed, if desired.

Calibration voltage generator 202 provides accurate stable voltages representing the memory voltages which should correspond to the selected PRF's, say 0, 4, 8 and 12 volts. The calibration voltages are supplied to selector 203 which is controlled by a binary counter 204 so as to supply the proper calibration voltage to line 205.

The output of the reference pulse generator 201 is also supplied to a test pulse gate 206 and to a pulse period gate generator 210, the latter controlling the intervals during which gate 206 is open and closed. Pulses of the proper PRF are delivered through line 207 to the video-to-test pulse control circuit 116.

The PRF and calibration voltage which is nearest the then-existing angle of the aircraft to the beam site is selected by utilizing the corresponding memory signal. In this embodiment the calibration is performed for the beam which is next to arrive.

As previously explained, after a given beam has passed, the identity circuits switch the memory-to-comparator control 156 for the reception of the next beam. Thus, the memory signal in line 157 corresponds to the next-expected beam. This memory signal is supplied through line 208 to a clamped staircase generator 209. Pulses from generator 201 are supplied through a trigger gate 211 to the staircase generator 209. Trigger gate 211 is opened by a signal through line 212 at the trailing edge of the gate from charge gate generator 147, and remains open long enough to pass at least four reference pulses, whereupon it recloses.

The staircase generator produces a stepped voltage which steps from one level to the next upon the arrival of each reference pulse until the then-existing memory level is reached. Successive levels actuate binary counter 204 to step one count for each level. The output of the binary counter is fed to the calibration voltage selector 203 and accordingly picks the one of the four input calibration voltages which is delivered to line 205. The trailing edge of the charge gate in line 212 resets the binary counter as the trigger gate 211 is opened.

FIG. 13 illustrates this operation. FIG. 13(a) shows the series of reference pulses 213 from generator 201. FIG. 13(b) shows the several calibration voltages 214–217 available from generator 202. FIG. 13(c) shows the trigger gate 218.

FIG. 13(d) illustrates the operation of the staircase generator. The then-existing memory voltage delivered through line 208 is assumed to be at the 4-volt level shown by line 219. The first pulse 213 delivered to the staircase generator produces a voltage level as shown at 221. This is assumed to be −2 volts for a reason to be explained. The next pulse 213 produces a higher level as shown at 222. Successive pulses would produce successively higher levels, as shown at 223 and 224 if the clamping level 219 were higher. However, with the clamping level as shown, only levels 221 and 222 are produced in the staircase generator corresponding to the first two reference pulses.

The binary counter 204 accordingly receives levels 221 and 222, and actuates selector 203 to select the second calibration voltage level (215). Thus, a 4-volt calibration level is picked corresponding to the 4-volt memory voltage here assumed.

In FIG. 13(d) it will be noted that successive voltage levels of the staircase correspond to 4-volt increments, which is the difference between successive calibration voltage levels. However, the staircase is displaced so that the calibration voltage levels lie midway between adjacent staircase levels. This is a convenient way of insuring that the staircase generator will pick the calibration voltage which is nearest to the then-existing memory voltage. For example, if the memory voltage 219 lies anywhere between +2 and +6 volts, the 4-volt calibration voltage will be selected.

The elimination of reference pulses to obtain the proper PRF for the selected calibration voltage is controlled by the latter. The selected voltage is fed through line 205, control unit 158, line 119 and line 225 to the pulse period gate generator 210. Generator 210 is supplied with reference pulses through line 226, and is arranged to start the generation of a gate slightly after the arrival of a pulse, as illustrated by the leading edge 228 of pulses 229 in FIG. 13(e). The proper duration of the gate depends on the number of pulses to be eliminated and is controlled by the calibration voltage from line 225, a higher calibration voltage producing a longer gate. For a zero calibration voltage no reference pulses are to be eliminated and gate pulse 229 will be terminated prior to the arrival of the next pulse 213. For a 4-volt level the gate will be long enough to eliminate the next pulse, say 16–24 microseconds. For an 8-volt level it will be long enough to eliminate two pulses, say 32–40 microseconds, etc.

The gate pulses 229 are supplied to test pulse gate 206 to close the latter. Reference pulses from generator 201 pass through gate 206 to line 207 except when the gate is closed. Accordingly, the PRF of the test pulses in line 207 corresponds to the selected calibration voltage. This is illustrated in FIG. 13(f) where every other reference pulse has been eliminated, giving a pulse interval of 32 microseconds corresponding to the 4-volt calibration voltage selected.

During calibration the test pulses in line 207 are supplied through control unit 116 to the pulse amplifier 118 and thence to the tracking comparator 111. They are also supplied to line 117 so that they function to control the linear sweep generator 98 in the same manner as video pulses. The selected calibration voltage is supplied through line 205, control unit 158 and line 119 to the tracking comparator 111. Consequently, if there is any inaccuracy in the generation or control of the linear sweep, or in tracking comparator balance, etc., an error voltage will be produced by tracking comparator 111 which will be integrated in 125, amplified in 135 and appear in the output of charging amplifier 136.

The latter is connected by line 231 to the servo gate 232 which is open during the calibration interval and closed during beam reception. Accordingly, the calibration error signal will be fed to width servo integrator 233 arranged to control the duration of the retrace gate produced in 97, as indicated by the arrows 102 in FIG. 9(b). This controls the starting point of the linear sweep, as previously explained. By this servo action, the generation of the linear sweep is corrected until the error voltage in line 231 is reduced to zero or a negligible value. Thus, when the next beam passes over the aircraft, and the receiver is switched to the operating mode, the linear sweep will have been adjusted to yield the proper outputs for that beam with a high degree of precision. The integration in 233 is arranged to maintain its control throughout the passage of the beam.

Instead of using a clamped staircase generator and a binary counter for selecting the calibration voltage and test pulse interval, other arrangements could be employed for the purpose. For example, the memory voltage could be compared with the several calibration voltages to select the one that gives the smallest difference.

As above explained, the switching from calibration to normal operating modes is effected by the renewable gating generator 195 at the beginning of a beam passage. The sensitivity of this gating channel may be made somewhat greater than the normal operating channel so that the switching from calibration to normal operation takes place prior to the reception of video pulses of sufficient amplitude to actuate the angle data recovery circuits. Or, delay line 95 may be employed to produce a small delay in the angle data recovery channel to allow the switching to be completed before the video pulses reach the decoding circuits. Since the initial pulses have a relatively small effect on the decoding, the loss of one or a few may not be important.

The decoding receiver of FIG. 8 is designed to give highly accurate angle information with respect to all three transmitter sites. The angle information from the two elevation sites can be used as described in our above-identified application to compute a desired landing path. The computer output may be used in an auto-pilot arrangement for automatically landing the aircraft, or may be used to give the pilot a visual indication of departures from the desired path. The azimuth indication may likewise be used for automatically controlling the plane in azimuth, or to give the pilot a visual indication.

In many instances it may not be necessary for the aircraft to utilize information from all three sites, or to decode the beams with the precision contemplated in the embodiment of FIG. 8. For example, in the landing of a light plane under conditions of poor but not zero visibility, it may suffice to giude the plane down an appropriate glide angle so that the plane will be in approximately the proper position with respect to the runway for the pilot to complete the landing maneuver visually. In such case a much simpler receiver may suffice.

In our aforesaid application the coding of an elevation beam as a function of the tangent of the elevation angle, rather than as a function of the angle itself, is described. While this is not considered necessary for many practical applications, if desired coding of the beam in accordance with the present invention may be in terms of the tangent.

The invention has been described in connection with specific embodiments thereof. It will be understood that the coding system of the invention may be used with many different types of coding and decoding equipment. Also, many modifications in the specific embodiments described may be made within the spirit and scope of the invention. When desired, selected features of the invention may be employed and others omitted. Although the specific transmitting and receiving equipment described is particularly designed for use with the coding system of the invention, features thereof may be used with other coding procedures where appropriate.

We claim:

1. In an aircraft landing system, the combination which comprises means for transmitting a pair of vertically scanning beams from respective front and rear sites spaced along a runway, each of said beams repeatedly scanning from approximately a horizontal angle to a predetermined elevation angle, means for modulating each of said beams by a series of angle-coding pulses during a beam scan having a time spacing varying progressively as a predetermined function of the beam angle from said approximately horizontal angle respectively, the minimum spacing of said pulses of the beam from said front site being substantially greater than said pulses of the beam from said rear site, and means for modulating said beam from the front site by additional pulses for identification thereof.

2. In an aircraft landing system, the combination which comprises means for transmitting a pair of vertically scanning elevation beams from respective front and rear sites spaced along a runway and a horizontally scanning azimuth beam from a site at the rear of the runway, said beams repeatedly and alternately scanning through respective angles, the vertical scanning ranges extending from approximately a horizontal reference angle to predetermined respective elevation angles and the horizontal scanning range extending to each side of a reference angle along the runway, means for modulating each of said beams by a series of pulses during a beam scan having a time spacing progressively increasing as a function of the beam angle from the respective reference angle, the minimum spacing between said pulses of the front elevation and azimuth beams being substantially greater than between said pulses of the rear elevation beam, means for modulating said front elevation and azimuth beams by additional pulses paired with the pulses of said series modulated thereon to provide identification pulse-pair spacings, the identification spacings of the azimuth beam being different on opposite sides of the azimuth reference angle and different from the identification spacing of the front elevation beam, and the identification spacings of said front elevation and azimuth beams being less than the minimum spacing of said pulses of the rear elevation beam.

3. In an aircraft navigation system, the combination which comprises a scanning antenna for transmitting a beam repeatedly scanning through a predetermined angle range, means for generating angle increment pulses corresponding to successive positions of said scanning antenna during a scanning cycle, a pulse counter for counting said pulses from a predetermined reference beam-angle position, a source of timing pulses recurring at time spacings which are short compared to the spacings of said angle increment pulses, means for utilizing said timing pulses to repeatedly determine the count in said pulse counter during a scanning cycle and produce corresponding signals at time intervals varying with the pulse counts on successive determinations, and means for utilizing said signals to produce corresponding pulse modulations of said scanning beam.

4. In an aircraft navigation system, the combination which comprises a scanning antenna for transmitting a beam repeatedly scanning through a predetermined angle range, means for generating angle increment pulses corresponding to successive positions of said scanning antenna during a scanning cycle, a first pulse counter for counting said pulses from a predetermined reference beam-angle position, a source of timing pulses recurring at time spacings which are short compared to the spacings of said angle increment pulses, transfer means for transferring the count in said pulse counter to a second counter, means for utilizing said timing pulses to produce changes in the count in said second counter and produce a signal when a predetermined count is reached, means for utilizing said signal to produce a corresponding pulse modulation of said beam, and means for transferring counts from said first to said second counter after each said signal has been produced to thereby produce successive signals at time intervals varying with the pulse counts successively transferred.

5. Apparatus in accordance with claim 4 including means for supplying angle increment pulses to said second counter occurring during intervals between successive transfers of counts thereto from the first counter to produce a corresponding count change in said second counter.

6. In an aircraft navigation system, the combination which comprises a scanning antenna for transmitting a beam repeatedly scanning through a predetermined angle range, means for generating angle increment pulses corresponding to successive positions of said scanning antenna during a scanning cycle, a first pulse counter for counting said pulses from a predetermined reference beam-angle position, a source of timing pulses recurring at time spacings which are short compared to the spacings of said angle increment pulses, transfer means for transferring the count in said pulse counter to a second counter, a fixed interval counter, means for utilizing said timing pulses to repeatedly change the counts in said fixed interval and second counters successively to respective predetermined counts and produce corresponding signals, means for resetting said fixed interval counter and transferring counts from said first to said second counter after said respective predetermined counts have been reached, whereby said signals are produced successively at time intervals varying with the pulse counts successively transferred to said second counter, and means for utilizing said signals to produce corresponding pulse modulations of said beam.

7. Apparatus in accordance with claim 6 including means for supplying angle increment pulses to said second counter occurring during intervals between successive transfers of counts thereto from the first counter to produce a corresponding count change in said second counter.

8. In an aircraft receiver for decoding a scanning beam having pulse modulations transmitted at intervals varying with the beam angle, the combination which comprises decoding and storage means for receiving said pulse modulations and producing a stored signal corresponding to the angle of the aircraft from the beam site, gate means for supplying pulse modulations to said decoding means, means for utilizing said stored signal to produce tracking gate pulses bracketing the time of arrival of pulse modulations corresponding to the stored angle signal, and means for utilizing said tracking gate pulses to control said gate means.

9. In an aircraft receiver for decoding a scanning beam having pulse modulations transmitted at intervals varying with the beam angle, the combination which comprises a sweep wave generator, sweep control means for utilizing said pulse modulations to control the duration of the sweeps produced by said generator, gate means for supplying pulse modulations to said sweep control means, means for utilizing the sweep amplitudes to produce a stored signal corresponding to the angle of the aircraft from the beam site, means for comparing said stored signal and the sweeps from said generator to produce tracking gate pulses bracketing the time of arrival of pulse modulations corresponding to the stored angle signal, and means for utilizing said tracking gate pulses to control said gate means.

10. In an aircraft receiver for decoding a scanning beam having pulse modulations transmitted at intervals varying with the beam angle, the combination which comprises a sweep wave generator, sweep control means for utilizing said pulse modulations to terminate respective sweeps of said generator and control the initiation of successive sweeps thereof, a tracking gate for supplying pulse modulations to said sweep control means, means for utilizing the sweep amplitudes to produce a stored signal corresponding to the angle of the aircraft from the beam site, means for comparing said stored signal and the output of said sweep generator to produce tracking gate pulses during the intervals the sweep output is within a predetermined range with respect to the stored signal, and means for utilizing said tracking gate pulses to open said tracking gate during the pulses, said tracking gate being normally closed in the intervals between tracking gate pulses.

11. In an aircraft receiver for decoding a scanning beam having pulse modulations transmitted at intervals varying with the beam angle, the combination which comprises decoding and storage means for receiving said pulse modulations and producing a stored signal corresponding to the angle of the aircraft from the beam site, tracking gate means for supplying pulse modulations to said decoding means, means for utilizing said stored signal to produce tracking gate pulses bracketing the time of arrival of pulse modulations corresponding to the stored angle signal, means for utilizing said tracking gate pulses to open said tracking gate during the pulse occurrences, a search gate for supplying pulse modulations to said decoding means, and means utilizing pulse modulations passing through said tracking gate for closing said search gate.

12. In an aircraft receiver for decoding a scanning beam having pulse modulations transmitted at intervals varying with the beam angle, the combination which comprises decoding means for receiving said pulse modulations and producing signals varying with the beam angle, tracking gate means for supplying said pulse modulations to said decoding means, means for utilizing said signals to produce a stored signal corresponding to the angle of the aircraft from the beam site, means for utilizing said stored signal to produce tracking gate pulses bracketing the time of arrival of pulse modulations corresponding to the stored angle signal, means for utilizing said tracking gate pulses to open said tracking gate during the pulse occurrences, a search gate for supplying pulse modulations to said decoding means, storage means responsive to pulse modulations passing through said tracking gate during a beam passage over the aircraft for producing a search gate control signal persisting for at least a substantial portion of the interval to the next beam passage, and means for utilizing said search gate control signal to control the closing of said search gate.

13. In an aircraft receiver for decoding a scanning beam having pulse modulations transmitted at intervals varying with the beam angle, the combination which comprises decoding means for receiving said pulse modulations and producing signals varying with the beam angle, tracking gate means for supplying pulse modulations to said decoding means, means for utilizing said signals to produce a stored signal corresponding to the angle of the aircraft from the beam site, means for utilizing said stored signal to produce tracking gate pulses bracketing the time of arrival of pulse modulations corresponding to the stored angle signal, means for utilizing said tracking gate pulses to open said tracking gate during the pulse occurrences, a search gate for supplying pulse modulations to said decoding means, integrating means responsive to pulse modulations passing through said tracking gate during beam passages for producing a search gate control signal, said search gate control signal persisting during the interval to the next beam passage and gradually decaying therein, and means for utilizin said search gate control signal to close said search gate when the signal exceeds a predetermined level.

14. In an aircraft receiver for decoding a plurality of scanning beams having pulse modulations transmitted at intervals varying with the respective beam angles, the combination which comprises decoding means for receiving said pulse modulations during respective beam passages over the aircraft and producing stored signals corresponding to the aircraft angle from respective beam sites, a tracking gate for supplying pulse modulations to said decoding means, means utilizing said stored signals for producing tracking gate pulses bracketing the time of arrival of pulse modulations corresponding to the stored angle signals, means for utilizing said tracking gate pulses during corresponding beam passages to open said tracking gate during the pulse occurrences, a search gate for supplying pulse modulations to said decoding means, integrating means responsive to pulse modulations passing through said tracking gate during successive beam passages for producing a search gate control signal, and means for utilizing said control signal to close said search gate when the signal exceeds a predetermined level corresponding to pulse modulations passing through said tracking gate during a plurality of successive beam passages over the aircraft, said predetermined level lying between levels of the search gate control signal corresponding to pulse modulations passing through said tracking gate during successive passages of all and of less than all of said plurality of scanning beams.

15. In an aircraft receiver for decoding a plurality of scanning beams having pulse modulations transmitted at intervals varying with the respective beam angles, the combination which comprises decoding means for receiving said pulse modulations during respective beam passages over the aircraft and producing stored signals corresponding to the aircraft angle from respective beam sites, tracking and search gates for supplying pulse modulations to said decoding means, means utilizing said stored signals for producing tracking gate pulses bracketing the time of arrival of pulse modulations corresponding to the stored angle signals, means for utilizing said tracking gate pulses during corresponding beam passages to open said tracking gate and close said search gate during the pulse occurrences, integrating means supplied with pulse modulations passing through said tracking and search gates for producing a search gate control signal persisting in the interval between successive beam passages, said integrating means being arranged so that pulse modulations through the tracking gate change the control signal in one direction and through the search gate in the opposite direction, and means for utilizing said control signal to close said search gate when the signal exceeds a predetermined level in said one direction.

16. In an aircraft receiver for decoding a scanning beam having pulse modulations transmitted at intervals varying with the beam angle, the combination which comprises a sweep wave generator, sweep control means for utilizing said pulse modulations to control the duration of the sweeps produced by said generator, means for utilizing the sweep amplitudes to produce a stored signal corresponding to the angle of the aircraft from the beam site, hold gate means for stopping said sweeps, means for actuating said hold gate means a short interval after the time a pulse modulation corresponding to the existing angle of the aircraft from the beam site should arrive, and means for utilizing a pulse modulation received during said interval to inhibit said actuating.

17. In an aircraft receiver for decoding a scanning beam having pulse modulations transmitted at intervals varying with the beam angle, the combination which comprises a sweep wave generator, sweep control means for utilizing said pulse modulations to control the duration of the sweeps produced by said generator, means for utilizing the sweep amplitudes to produce a stored signal corresponding to the angle of the aircraft from the beam site, a hold gate generator for stopping said sweeps, means for utilizing said stored signal to produce hold gate actuating pulses at short intervals after the time respective pulse modulations corresponding to the stored angle signal should arrive, means for supplying said actuating pulses to said hold gate generator, and means for utilizing pulse modulations received during said intervals to inhibit the actuation of said hold gate generator.

18. In an aircraft receiver for decoding a scanning beam having pulse modulations transmitted at intervals varying with the beam angle, the combination which comprises a sweep wave generator, sweep control means for utilizing said pulse modulations to terminate respective sweeps of said generator and control the initiation of successive sweeps thereof, means for utilizing the sweep amplitudes to produce a stored signal corresponding to the angle of the aircraft from the beam site, a hold gate generator connected with said sweep generator for stopping said sweeps, means for comparing said stored signal and the output of said sweep generator to produce hold gate actuating pulses at short intervals after the time respective pulse modulations corresponding to the stored angle signal should arrive, means for supplying said actuating pulses to said hold gate generator, and means for utilizing pulse modulations received during said intervals to inhibit the actuation of said hold gate generator.

19. In an aircraft receiver for decoding a scanning beam having pulse modulations transmitted at intervals varying with the beam angle, the combination which comprises a sweep wave generator, sweep control means for utilizing said pulse modulations to terminate respective sweeps of said generator and control the initiation of succesive sweeps thereof, a tracking gate for supplying pulse modulations to said sweep control means, means for utilizing the sweep amplitudes to produce a stored signal corresponding to the angle of the aircraft from the beam site, means for comparing said stored signal and the sweep output of said generator to produce tracking gate pulses during the intervals the sweep output is within a predetermined range with respect to the stored signal, means for utilizing said tracking gate pulses to open said tracking gate during the pulses, said tracking gate being normally closed in the intervals between tracking gate pulses, a hold gate generator connected with said sweep generator for stopping said sweeps, means for actuating said hold gate generator substantially at the trailing edges of said tracking gate pulses, and means for utilizing pulse modulations received during said tracking gate pulses to inhibit the actuation of said hold gate generator.

20. In an aircraft receiver for decoding a scanning beam having pulse modulations coded in accordance with the beam angle, the combination which comprises decoding means responsive to said pulse modulations for producing a signal output corresponding to the beam angle, a source of test pulses, a source of a calibration signal, means for supplying said test pulses to said decoding means during intervals between passages of said scanning beam over the aircraft to produce a test signal output, means for comparing said test signal output and said calibration signal to produce a signal varying with the error therebetween, and means for utilizing the error signal to correct said decoding means.

21. In an aircraft receiver for decoding a scanning beam having pulse modulations transmitted at intervals varying with the beam angle, the combination which comprises a sweep wave generator, sweep control means for utilizing said pulse modulations to control the duration of the sweeps produced by said generator, storage means for storing a signal corresponding to the angle of the aircraft from the beam site, comparator means supplied with said sweeps and stored signal for comparing the sweep amplitudes with the stored signal to produce an error signal, means for utilizing said error signal to correct said stored signal, a source of test pulses, a source of a calibration signal, means for supplying said test pulses to said sweep control means and said calibration signal to said comparator means during intervals between passages of said scanning beam over the aircraft to produce a test error signal, and means for utilizing said test error signal to correct said sweep control means.

22. In an aircraft receiver for decoding a scanning beam having pulse modulations transmitted at intervals varying with the beam angle, the combination which comprises a sweep wave generator, a retrace gate generator for terminating respective sweeps of said generator and controlling the initiation of successive sweeps thereof, means for utilizing said pulse modulations to produce corresponding actuations of said retrace gate generator, storage means for storing a signal corresponding to the angle of the aircraft from the beam site, comparator means supplied with said sweeps and stored signal for comparing the sweep amplitudes with the stored signal to produce an error signal, means for utilizing said error signal to correct said stored signal, a source of test pulses, a source of a calibration signal, means for supplying said test pulses to said sweep control means and said calibration signal to said comparator means during intervals between passages of said scanning beam over the aircraft to produce a test error signal, and storage means for utilizing said test error signal to control the duration of the gate produced by said retrace gate generator to correct the test error, the last-mentioned storage means being adapted to maintain the correction produced thereby for the next passage of said beam.

23. In an aircraft receiver for decoding a scanning beam having pulse modulations transmitted at intervals varying with the beam angle, the combination which comprises a sweep wave generator, sweep control means for utilizing said pulse modulations to control the duration of the sweeps produced by said generator, storage means for storing a signal corresponding to the angle of the aircraft from the beam site, comparator means supplied with said sweeps and stored signal for comparing the sweep amplitudes with the stored signal to produce an error signal, means for utilizing said error signal to correct said stored signal, means for producing a plurality of test pulse series having respectively different pulse intervals representing different beam angle pulse modulations, means for producing a plurality of calibration signals corresponding to said plurality of test pulse series respectively, selective means for supplying one of said test pulse series to said sweep control means and the corresponding one of said calibration signals to said comparator means during intervals between passages of said scanning beam over the aircraft to produce a test error signal, means for controling said selective means in accordance with a stored signal to select a test pulse series and calibration signal in the region of the beam angle corresponding to the stored signal, and means for utilizing said test error signal to correct said sweep control means for the next passage of said beam.

24. In an aircraft receiver for decoding a scanning beam having pulse modulations transmitted at intervals varying with the beam angle, the combination which comprises a sweep wave generator, a retrace gate generator for terminating respective sweeps of said generator and controlling the initiation of successive sweeps thereof, tracking and search gates for supplying said pulse modulations to said retrace gate generator to produce corresponding actuations thereof, storage means for storing a signal corresponding to the angle of the aircraft from the beam site, comparator means supplied with said sweeps and stored signal for comparing the sweep amplitudes with the stored signal to produce an error signal, means for utilizing said error signal to correct said stored signal, means for comparing said stored signal and the sweep output from said generator to produce tracking gate pulses during the intervals the sweep output is within a predetermined range with respect to the stored signal, means for utilizing said tracking gate pulses to open said tracking gate during the pulses, said tracking gate being normally closed in the intervals between tracking gate pulses, a hold gate generator connected with said sweep generator for stopping said sweeps, means for actuating said hold gate generator substantially at the trailing edges of said tracking gate pulses, means for utilizing pulse modulations passing through said tracking and search gates to inhibit the actuation of said hold gate generator for respective predetermined intervals, storage means responsive to pulse modulations passing through said tracking gate for producing a search gate control signal, means for utilizing said search gate control signal to control the closing of said seach gate, a source of test pulses, a source of a calibration signal, means for supplying said test pulses to said sweep control means and said calibration signal to said comparator means during intervals between passages of said scanning beam over the aircraft to produce a test error signal, and storage means for utilizing said test error signal to control the duration of the gate produced by said retrace gate generator and thereby the initiation of successive sweeps to correct the test error, the last-mentioned storage means being adapted to maintain the correction produced thereby for the next passage of said beam.

25. An aircraft receiver for decoding a scanning beam having angle coding pulse modulations with the intervals between successive angle-coding pulse modulations varying progressively with the beam angle from a predetermined reference angle, which comprises means for receiving said angle coding pulse modulations, a sweep wave generator for producing output signals whose amplitudes vary with the beam angle coding, and means for utilizing successive angle coding pulse modulations to terminate respectively preceding sweeps and initiate respectively succeeding sweeps.

26. An aircraft receiver for decoding a scanning beam having angle coding pulse modulations with the intervals between sucessive angle-coding pulse modulations varying progressively with the beam angle from a predetermined reference angle, which comprises means for receiving said angle coding pulse modulations, a sweep wave generator for producing output signals whose amplitudes vary with the beam angle coding, control means actuable to terminate a sweep of said generator and initiate a succeeding sweep with a time interval therebetween, and means for utilizing successive angle coding pulse modulations to produce successive actuations of said control means.

27. An aircraft navigation system which comprises means for transmitting a scanning beam from a predetermined site, said scanning beam repeatedly scanning through a predetermined angle range, means for modulating said beam by a series of angle-coding pulse modulations during a beam scan, the time spacing of successive angle-coding pulse modulations in said series varying progressively as a predetermined function of the beam angle with respect to a predetermined reference angle, said time spacing having a predetermined minimum corresponding to the reference angle, an aircraft receiver for receiving said series of pulse modulations during a beam passage thereover, a sweep wave generator in said receiver for producing output signals whose amplitudes vary with variations in the time spacing of said pulse modulations, control means actuable to terminate a sweep of said generator and initiate a succeeding sweep with a time interval therebetween substantially equal to said predetermined minimum spacing, and means for utilizing successive pulse modulations in said series to produce successive actuations of said control means.

28. An aircraft landing system, including means for transmitting a directive beam, means for moving said beam throughout an angular sweep with respect to a reference line of direction, said angular sweep being substantially greater in extent than the effective angular width of the beam in the direction of its motion, whereby an aircraft in the space swept by the beam will receive said beam only within a relatively small part of the complete sweep of the beam, means for modulating said beam by a continuous succession of repetitive pulses, and means for varying the repetition interval between said pulses with the motion of said beam to represent the angle of the beam with respect to said reference line as a substantially linear direct function of said angle, said interval varying from a minimum value when said angle is zero to a maximum value when said angle is at its maximum, and thus representing the value of said angle more frequently when said angle is small and less frequently when said angle is large, whereby the rate at which an aircraft in said space receives information as to its angular position is greatest on said reference line and less in regions away from said reference line.

References Cited by the Examiner
UNITED STATES PATENTS

| | | | |
|---|---|---|---|
| 2,429,630 | 10/47 | Kandoian | 343—110 |
| 2,449,982 | 9/48 | De Rosa | 343—106 |
| 2,510,723 | 6/50 | Strong et al. | 343—107 |
| 2,531,918 | 11/50 | O'Brien | 343—106 |
| 2,539,905 | 1/51 | Herbst | 343—6 |
| 2,586,810 | 2/52 | Frum | 343—106 |
| 2,826,378 | 3/58 | Childs | 343—107 XR |
| 2,859,440 | 11/58 | Begovich et al. | 343—108 |
| 2,864,080 | 12/58 | Rodgers | 343—106 |
| 2,883,662 | 4/59 | Rodgers | 343—106 |
| 2,954,555 | 9/60 | Güttinger et al. | 343—102 XR |

KATHLEEN H. CLAFFY, *Primary Examiner.*

CHESTER L. JUSTUS, *Examiner.*